Sept. 9, 1969      W. L. GOODMAN      3,466,450
SWIMMING POOL CHLORINE CONCENTRATION CONTROLLER USING
REFERENCE RESISTOR IN CONTROL CIRCUIT
Filed Aug. 4, 1966      2 Sheets-Sheet 1
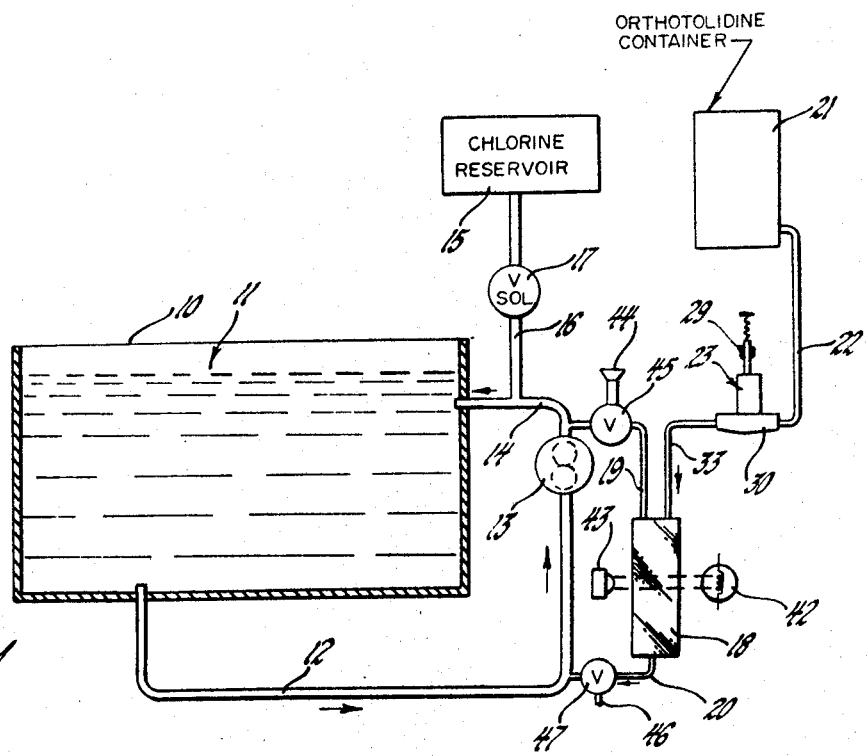
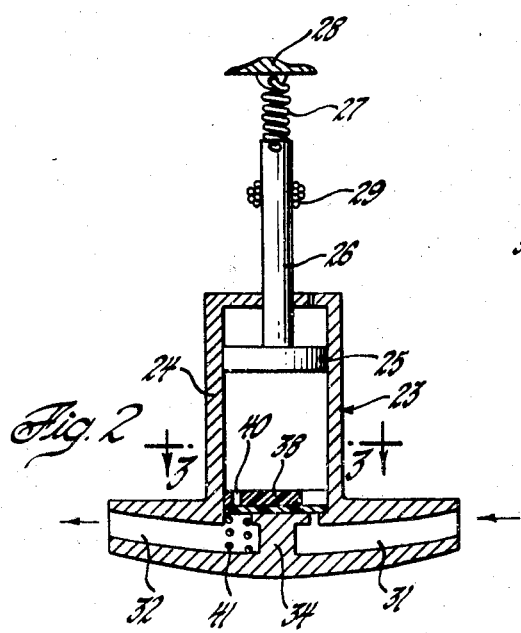
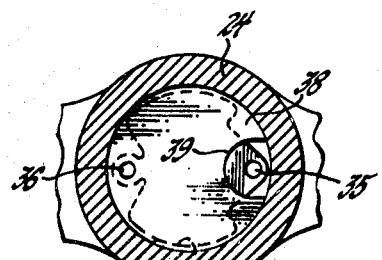
INVENTOR
William L. Goodman
BY Townshend & Measle
ATTORNEY

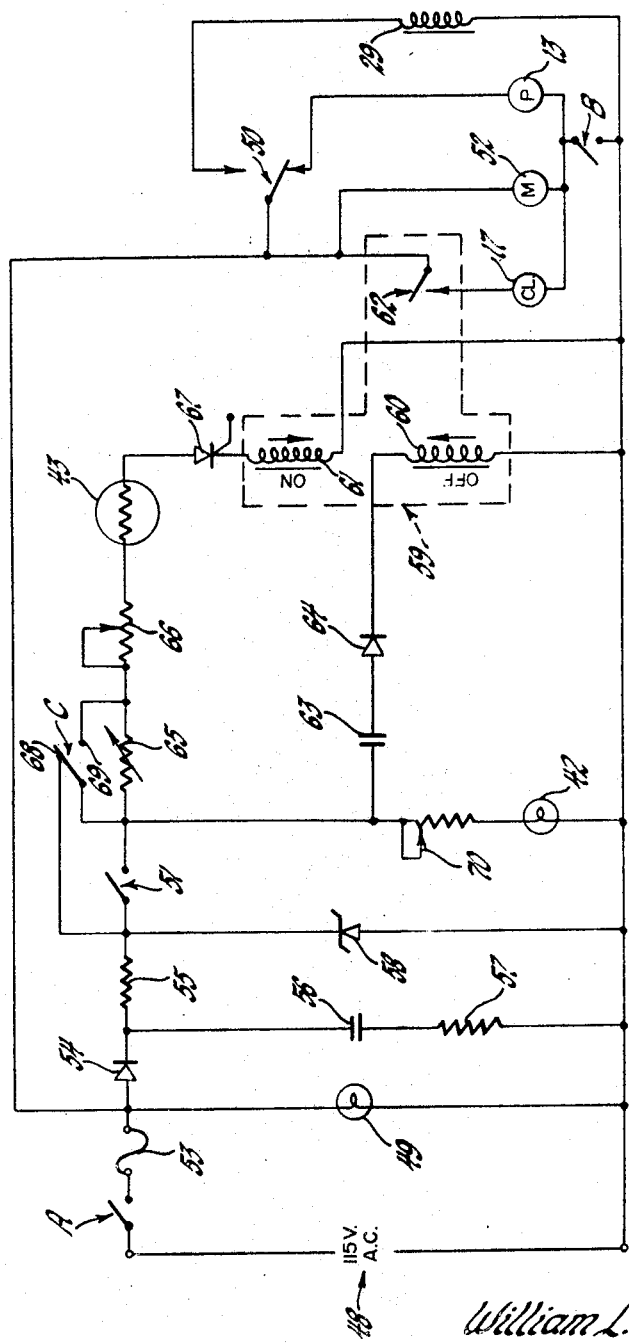

United States Patent Office 3,466,450
Patented Sept. 9, 1969

3,466,450
SWIMMING POOL CHLORINE CONCENTRATION CONTROLLER USING REFERENCE RESISTOR IN CONTROL CIRCUIT
William L. Goodman, 1305 Cherry Ave., Charlottesville, Va. 22903
Filed Aug. 4, 1966, Ser. No. 570,291
Int. Cl. G01n 21/26, 21/06, 21/22
U.S. Cl. 250—218             8 Claims

ABSTRACT OF THE DISCLOSURE

A method and apparatus for controlling the amount of chlorine present in a swimming pool wherein at periodic intervals a specified volume of the pool water is pumped into a testing chamber where it is combined with the reagent orthotolidine to change the color of the water in proportion to the amount of chlorine present. The mixture is then optically tested for color by means of a photocell, and electrically compared to a standard value of chlorine concentration by utilizing a reference comparison resistance. The amount of chlorine in the pool is thereafter controlled in accordance with the electrical comparison signal.

---

The present invention relates in general to water purification, and in particular to the art of swimming pool water chlorination.

Installation of swimming pools is a major business enterprise of the present era, with emphasis on private custom-built pools of the "back yard" type that are installed and sold on easy term payments. All swimming pools require addition of bacteria killing agents that are soluble or miscible in the pool water; the generally prescribed and most widely used being chlorine or compounds thereof. Public and commercial swimming pools occasionally are equipped with automatic water chlorination apparatus designed to maintain in the circulating water a chlorine concentration of from about 0.1 to about 0.6 part per million. Such apparatus is complex, and so expensive to install and maintain that usually it is beyond the reach of private small pool owners who must, therefore, rely upon manual additions from time to time of batches of pool treating materials, generally granular chlorine concentrate.

The method of pool water chlorination by batch additions of chlorine is unsatisfactory for several reasons. It makes no provision for maintaining the degree of chlorine concentration within "safe" limits, generally considered to be between 0.1 and 0.6 part per million of the volume of pool water. A concentration below 0.1 p.p.m. would be unsafe due to insufficient bacteria killing capacity. A concentration higher than 1.0 p.p.m. would be extremely undesirable, but not unsafe from the bacterial killing point of view. Too high a concentration has the effect of stinging the eyes, irritating the skin, and altering artificial hair color. The ideal permissible range of chlorine concentration is usually considered to be from about 0.4 to about 0.6 part per million.

The present invention provides a simple, low cost apparatus, and method, by which the degree of chlorine concentration in the water circulating system of a swimming pool is automatically maintained within a predetermined range.

The invention further provides an automatic chlorination control system for swimming pools, by which, at predetermined intervals of time, a known specific volume sample of the pool water is tested by comparison with a standard reference means simulating a pool water chlorine concentration of predetermined strength, to detect electrically the instant difference, if any exists, between the simulated concentration strength of the standard reference means and the instant actual chlorine concentration strength in the test water sample. Control means electrically responsive to a detected difference operates in accordance with the value of the difference either to add or not to add fresh chlorine to the pool water, depending upon the condition of its chlorine concentration at the time the test is made. If the test indicates a demand for fresh chlorine, it is added at a predetermined rate of flow until the next periodic test determines whether addition is to continue or stop.

In the accompanying drawings:

FIG. 1 is a diagrammatic view illustrating the manner in which the present invention is used in association with the circulating water system of a conventional swimming pool.

FIG. 2 is substantially a central vertical sectional view through the reagent injector shown in FIG. 1.

FIG. 3 is a sectional view on line 3—3 of FIG. 2.

FIG. 4 is a diagram of an electronic system constituting a part of my invention.

The present invention, viewed broadly, is a water chlorination system and method wherein a sample of water containing chlorine in solution is compared electrically with an electrically simulated reference standard representing a chlorine concentration that is desired to be maintained in a circulating body of water from which the sample is taken. The purpose of the comparison is to detect the instant difference, if any, between the actual chlorine concentration in the sample and the chlorine concentration simulated by the reference standard. Means electrically responsive to a detected difference operates in accordance with the value of that difference, expressed electrically, either to add or not to add fresh chlorine to the water from which the sample is taken. Operation of the chlorine addition means is controlled by the instant effect of an optical impedance placed in the path of a beam of light passed through the sample water onto a means electricaly responsive to the intensity of the light directed thereon. The optical impedance is chemically produced in the sample water by injection therein of a reagent which combines chemically with the chlorine in the sample water and gives a product that varies the opacity of the sample in accordance with the amount of chlorine in solution in the sample water at the time the comparison is made.

The optical impedance established by the instant opacity of the sample water is converted into electrical impedance by the aforesaid means that is electrically responsive to a detected difference between the actual chlorine concentration in the sample water and the simulated chlorine concentration of the reference standard. The resultant electrical impedance influences the operation of an electrical control system in which the electrical impedance is a part. The electrical value of this impedance governs voltage responsive means which operates to add fresh chlorine to the pool water on demand.

In the embodiment of the invention herein disclosed a swimming pool tank 10 contains a recirculating body of chlorinated water 11 that is drawn from the tank bottom through a conduit 12 which communicates with the low pressure side of an electrically driven pump 13 that discharges from its high pressure side through a return conduit 14 back into the tank. While the pump is in operation the body of pool water is recirculated continuously through the system from bottom to top of the pool.

On demand, a liquid chlorine concentrate of high concentration, supplied from a chlorine reservoir 15, is fed from the reservoir through a conduit 16 that communicates with the pool water return conduit 14, whereby to entrain the chlorine concentrate in the water entering the pool. The chlorine concentrate is fed by gravity at a predetermined constant rate of flow, and opening or closing of the supply conduit 16 is effected by means of a solenoid control valve 17 that is operated from the electronic system hereinafter described.

While the pump 13 is in operation it passes a portion of the circulating pool water through a bypass system that includes a transparent wall sample test chamber 18. A branch conduit 19 leads from the conduit 14 on the high pressure side of the pump to an inlet of chamber 18, and an outlet from the chamber communicates through a discharge conduit 20 with the conduit 12 on the low pressure side of the pump. The capacity of the test chamber need not be large. I have found that one which, when full, contains about eight cubic centimeters is practical and well suited to the practice of my invention. The shape of the chamber is optional, so long as it provides a pair of parallel opposed side walls arranged for passage of a beam of light through both. A practical test chamber is one in which the walls through which the light beam is directed are spaced apart a distance of about two centimeters, establishing the thickness of water traversed by the light beam.

The specific reagent employed in the practice of my invention is orthotolidine. This is a normally water-clear liquid which combines chemically with solutions of chlorine in water to give a liquid reaction product that varies in color from light yellow to green with its color intensity depending on the degree of chlorine concentration in the water to which it is added.

The orthotolidine is supplied from a container 21 through conduit 22 to an injector 23. This comprises a cylinder 24 having therein a reciprocable piston 25 with its rod 26 extending axially through the head of the cylinder and connected at its upper terminal portion to a retracting spring 27 secured to a fixed support 28. Intermediate the cylinder head and the spring 27 the piston rod 26 is surrounded by the coil of a solenoid 29 whereof the piston rod is the reciprocable core. The solenoid is of the push type and, when energized, acts to force the piston downward in a protractile stroke within the cylinder. Upon deenergization of the solenoid the spring 27 pulls the piston up to its equilibrium position. As orthotolidine in caustic, all surfaces of its injection system exposed to direct contact therewith are either coated with or made of corrosion resistant material, preferably plastic.

The lower end of cylinder 24 carries a T-head 30 having an inlet passage 31 which communicates with the conduit 22 leading from the orthotolidine container. Head 30 is provided also with an outlet passage 32 which communicates with a conduit 33 that leads to another inlet of the test chamber 18. The passages 31 and 32 are separated at their inner ends by a vertical partition 34, at opposite sides of which the respective inner ends of the passages open upwardly to the interior of the cylinder through an inlet port 35 and an outlet port 36. When the injector is not in operation these ports are closed by overlying flaps of a thin flexible plastic pad 37, the shape of which is indicated in phantom line in FIG. 3. Pad 37 is seated on the top of the partition 34 and is held thereagainst by a rigid plastic disc 38 that is press fitted in the lower end portion of the cylinder. The body of disc 38 which overlies the inlet port 35 is removed to provide a peripheral, inwardly extending opening 39. A vertical bore 40 is provided through the disc 38 above the outlet port 36. The opening 39 is sufficiently large to allow free upward flexing of the underlying flap of pad 37 to open inlet port 35. The pressure of incoming orthotolidine sucked into the cylinder by the piston during its upward travel lifts the pad flap and holds it off its seat while the orthotolidine charge is entering the cylinder. A small expansion spring 41 in the inner end of the outlet passage 32 biases the other flap of pad 37 upwardly against disc 38 to close the bore 40 until the tension of the spring is overcome by the pressure of orthotolidine being ejected from the cylinder when the solenoid 29 operates to push the piston through a down stroke, thereby flexing the pad flap downwardly to open the outlet port 36.

Automatic operation of the orthotolidine injector is governed by an electronic control system which includes a lamp 42 arranged to pass a beam of light, indicated by phantom line in FIG. 1, through the test chamber 18 and the sample water therein onto a photocell 43 also in the system.

The amount of orthotolidine injected into the filled test chamber during each testing cycle is constant. The specific amount to be injected depends upon the volumetric capacity of the test chamber and the degree of concentration of chlorine in the sample of pool water under test. As the function of the test chamber is to modulate the light beam intensity in accordance with the chemically induced opacity of the sample pool water, and as the amount of orthotolidine necessary to effect complete combination with all the chlorine present in the test chamber pool water depends upon the specific volume of the sample under test, it is apparent that the lower the volume of sample water used for a test the smaller will be the amount of orthotolidine needed to effect the complete chemical reaction. Orthotolidine is expensive. The amount of orthotolidine used to stabilize the opacity of the sample will be the amount required to effect complete combination with all the chlorine in solution in that sample.

In practicing my invention I utilize a small test chamber containing eight cubic centimeters of pool sample water. I have found by experimentation that an addition of about three or four drops of orthotolidine will effect complete reaction with all the chlorine present in concentrations ranging from a trace up to about 2.0 p.p.m. This represents an overdose of orthotolidine, but as the excess has no reaction partner it has no effect upon the opacity of the test sample. The excess remains water-clear transparent.

My invention is designed specifically to maintain a circulating body of swimming pool chlorinated water at a chlorine concentration ranging from about 0.4 p.p.m. to about 0.6 p.p.m., the desideratum being a chlorine concentration of 0.5 p.p.m. This is accomplished automatically by an electronic control system which establishes a reference standard simulating a chlorine concentration of 0.4 p.p.m. and which periodically compares this standard with a test sample of the pool water to detect any variance between the simulated chlorine concentration of the reference standard and the actual instant chlorine concentration of the sample under test. If the test indicates a chlorine concentration in the test sample lower than the concentration simulated by the reference standard the system operates to add fresh chlorine at a constant rate to the pool water until initiation of the next following test cycle. If the test indicates no deficiency of chlorine in the sample water the system operates to prevent any addition of fresh chlorine before initiation of the next test cycle. Comparison between the simulated and actual chlorine concentrations is effected by means electrically responsive to the instant intensity of a beam of light passed through the test sample water after the injection therein of an amount of orthotolidine sufficient to react completely with all the chlorine in solution in the sample. The product of the reaction between the chlorine and the orthotolidine varies the opacity of the test sample water in accordance with the amount of chlorine in solution in the sample water and thus correspondingly varies the intensity of the light beam projected onto a photocell which controls operation of the fresh chlorine addition means by response to the intensity of the light.

For purposes of calibration, hereinafter described, the test chamber 18 is equipped for filling and emptying independently of pump circulation. A funnel 44 communicates with inlet conduit 19 through a conventional two-way valve control 45, and a drain 46 communicates with the outlet conduit 20 through a similar two-way control valve 47.

The electronic system

FIG. 4 is a wiring diagram of the automatic control system forming a part of my invention. Alternating current is supplied at 48. Closure of a main "on-off" switch A energizes the control circuit and turns on a pilot light 49. The system includes the motor of the water circulating pump 13, the solenoid of the chlorine supply valve 17, the orthotolidine injector operating solenoid 29, the test chamber lamp 42, the photocell 43, a first time-controlled switch 50, a second time-controlled switch 51, a timer motor 52 which operates both timed switches 50 and 51, a fuse 53, a rectifier 54, a resistance 55, a capacitor 56, a resistance 57, a Zener diode 58, and a latching relay generally indicated by phantom line 59 and which includes an "off" coil 60 and an "on" coil 61, both of which operate a switch 62 for turning the chlorine addition control valve 17 on or off depending upon which of the relay coils is energized. The operating circuit for the relay "off" coil 60 includes in series therewith a capacitor 63 and a rectifier 64. The operating circuit for the "on" coil 61 of the relay includes in series therewith a variable resistance 65 (the standard reference means), a potentiometer 66, the photocell 43, and a voltage sensitive silicon controlled rectifier 67, hereinafter termed the SCR. A shunt circuit around resistance 65 includes an SPDT manual switch C having an upper contact 68 and a lower contact 69. Intensity of the test chamber lamp 42 is adjustable by means of a potentiometer 70. A manual switch B is placed in the return line for the chlorine valve 17, the timer 52, and the pump 13.

Calibration

Initial calibration of the system requires measurements of electrical values by instruments not ordinarily in the possession of pool owners, and for this reason initial factory calibration is preferred. It may, however, be made when the system is installed. Subsequent recalibration does not require such measurements.

The first step to be taken is to calibrate the variable resistance 65 to a fixed value which is adopted as simulating a pool water chlorine concentration of 0.4 p.p.m. This is accomplished by measuring the resistance across the photocell when the test chamber contains clear water, thus representing zero concentration of chlorine in the pool water; next, measuring the resistance across the photocell when the test chamber contains water having a chlorine concentration of 0.4 p.p.m. fully reacted with orthotolidine; and then adjusting the variable resistance 65 to a fixed value which equals the value of the difference between the two prior measurements.

Specifically, this initial calibration is effected as follows: (1) with switch B open and the test chamber containing clear water main switch A is closed, thus lighting the test chamber lamp; (2) potentiometer 70 is adjusted to a desired intensity of the light passed through the filled test chamber onto the photocell; (3) the photocell resistance is measured; (4) main switch A is reopened; (5) the test chamber is emptied and then filled with a prepared charge of water having chlorine in solution at a concentration of 0.4 p.p.m. completely reacted with orthotolidine; (6) main switch A is reclosed, thus relighting the test chamber lamp at its fixed intensity; (7) the photocell resistance is measured a second time; (8) the variable resistance 65 then is adjusted to and set at a fixed value which, when measured across its terminals, equals the value of the difference between the two prior measured resistances of the photocell; (9) manual switch C is opened at 68 and closed on contact 69; (10) timer switch 51 is manually closed; (11) potentiometer 66 is adjusted until the voltage across the SCR just equals the trigger voltage for which it is set (signalled audibly by the switch 62 in closing). This completes initial calibration.

Operation

Following initial calibration, main switch A being already closed, the test chamber valves 45 and 46 are manipulated to connect the test chamber into the hydraulic circulation system of the pump, and switch B is closed. This starts the pump and also the timer, placing the system in normal operation in repetitive cycles initiated at intervals determined by the setting of the timer, in this instance hourly.

In the beginning period of each cycle the timer 52 operates to open the first timed switch 50 whereby to stop pump 13 for a predetermined time covering the period of the test, trapping a sample of pool water in the test chamber 18, and at the same time energizing the solenoid 29 to inject a charge of orthotolidine into the sample water held quiescent in the test chamber. After an interval (about five minutes) the timer operates to close the second timed switch 51, thereby turning on the test chamber lamp 42 which then projects a beam of light through the sample water held in the test chamber and onto the photocell 43. This is a resistance photocell commercially identified as "Clairex #CL5M2L." Its resistance varies in response to the intensity of a beam of light directed upon it, decreasing with increase in the light intensity and increasing with decrease in the light intensity.

The "on" time of the test chamber lamp 42 is a function of the timer which is designed to operate the first timed switch 50 to open the pump circuit and close the orthotolidine injector circuit a few minutes before the second time switch 51 closes and turns on the lamp 42 until it reopens the test lamp circuit a few seconds later.

Coincident with the turning on of the lamp 42 the "off" coil 60 of the latching relay is energized to open switch 62 and thus prevent addition of fresh chlorine until the test determines whether or not fresh chlorine is needed.

The orthotolidine injected into the sample water combines chemically with all the chlorine present in solution and thus varies the opacity of the sample water consonant with the amount of chlorine present during the time the light beam from the lamp passes through the sample water onto the photocell 43. The intensity of the light beam which reaches the photocell is modulated by the opacity of the sample water and thus varies the resistance of the photocell. If the instant resistance of the photocell, with resistance 65 shunted out, is high enough to restore the resistance lost while resistance 65 is out, then the voltage across the SCR 63 will trigger the "on" coil 61 of the latching relay to close the switch 62 and open the chlorine addition control valve 17; whereupon the addition of fresh chlorine into the pool water will begin and will continue at a predetermined constant flow rate until the timer initiates the next test cycle.

If the instant resistance of the photocell, with resistance 65 out, is lower than the resistance which would exist if resistance 65 where included in series then the voltage across the SCR 67 will not be sufficient to permit the "on" coil 61 of the latching relay to close switch 62 and no chlorine will be added during that test cycle.

Recalibration of the system is necessary from time to time in order to compensate for aging of the test chamber lamp, the photocell, and the SCR. This is effected simply by (1) opening manual switch B; (2) disconnecting and emptying the test chamber and refilling it with clear water; (3) opening manual switch C at its lower contact 69 and closing it at its upper contact 68; and (4) adjusting the potentiometer 70 to increase the intensity of the test chamber lamp until the resistance response of the photocell establishes a voltage across the SCR equal to the trigger voltage for which it is set (again signalled audibly by the switch 62 in closing), thus restoring the system to the original condition existing at conclusion of its intial calibration.

Following recalibration, the test chamber is reconnected in the pump line, manual switch C is opened at its upper contact and closed on its lower contact to shunt out resistance 65, and manual switch B is closed to place the system again in normal operation.

Recalibration is simple because of the fact that initial calibration fixed the reference standard resistance 65 at a value simulating an 0.4 p.p.m. concentration of chlorine in the pool water; so that, with the now fixed resistance 65 in series with the photocell and the test chamber containing clear water, the only requirement is that the resistance of the photocell be brought to a value at which the voltage across the SCR 67 equals the trigger voltage for which it is set. This is accomplished by adjusting the lamp potentiometer 70 until the audible closing of the switch 62 signals that the trigger voltage of the SCR has been reached, thus completing recalibration.

It is apparent from the foregoing detailed description that initial calibration of the system establishes a fixed standard for the resistance 65 at a value such that when it is in series with the potentiometer 66 as set and the photocell 43, with the lamp 42 at a set light intensity and with the test chamber containing clear water, the voltage then existing across the SCR 67 will trigger operation of the latching relay "on" coil 61 to close switch 62 and start addition of fresh chlorine to the pool. The standard resistance value established for resistance 65 simulates a pool water chlorine concentration somewhat lower (here arbitrarily 0.4 p.p.m.) than the 0.5 p.p.m. concentration desired to be maintained, because no fresh chlorine is to be added until a test indicates a concentration below 0.5 p.p.m. Consequently, it follows that during normal operation with the reference resistance 65 shunted out, no fresh chlorine will be added to the pool water until the opacity of the water sample in the test chamber at the time a test is made so modulates the intensity of the light directed onto the photocell that its resistance is sufficiently low to replace the standard resistance lost when resistance 65 is shunted out.

It is to be understood that the herein disclosed embodiment of my invention is illustrative of a practical example and that the invention is not restricted thereto. It may comprise any structure falling within the scope of the invention as claimed.

I claim:

1. A swimming pool chlorination control system comprising, in combination: a swimming pool; means for establishing a sample of the pool water for test; means for projecting a beam of light through the sample water; means for injecting into the sample water a chemical reagent that reacts with chlorine therein to establish an opacity of the sample water that is variable in accordance with the amount of chlorine combined with the reagent; variable electrical impedance means responsive to opacity variation of the light beam passed through the reagent-conditioned sample water; fixed electrical impedance means simulating a predetermined concentration of chlorine in the pool water; an electronic comparison circuit including the light beam projecting means and the variable impedance means; means for including the fixed impedance in the circuit; means for removing the fixed impedance from the circuit; voltage sensitive means in the circuit operative to effect addition of fresh chlorine to the pool water upon the establishment of a trigger voltage; said trigger voltage being that voltage existing across said voltage sensitive means when the intensity of the light projected on the variable impedance means evokes a response producing an impedance in the circuit reaching a value having a predetermined relation to the impedance value of the fixed impedance means.

2. A swimming pool chlorination control system comprising, in combination: a swimming pool; means for establishing a sample of the pool water for test; means for projecting a beam of light through the sample water; means for injecting into the sample water a chemical reagent that reacts with chlorine therein to establish an opacity of the sample water and thereby impose a variable optical impedance in the light beam dependent in degree upon the amount of chlorine combined with the reagent; means electrically responsive to intensity of the light passed through the reagent conditioned sample water to convert its variable optical impedance to a correspondingly variable electrical impedance in an electronic comparison circuit; a fixed electrical impedance simulating a predetermined concentration of chlorine in the pool water; means for including the fixed electrical impedance in the comparison circuit; means for removing the fixed impedance from the comparison circuit; means in the comparison circuit operative upon the establishment therein of a predetermined trigger voltage to effect addition of fresh chlorine into the pool water; said trigger voltage being that voltage reached when the value of the variable electrical impedance created by its response to the instant intensity of the light projected thereon equals the value of the fixed impedance when it is included in the comparison circuit.

3. In the system of claim 2; when the fixed impedance is removed from the comparison circuit, said trigger voltage being that voltage reached when the value of the variable electrical impedance created by its response to the instant intensity of the light projected thereon equals the sum of the values of both the fixed and variable impedances before removal of the fixed impedance.

4. A method of regulating automatically in cycles the concentration of chlorine in solution in the circulating water of a swimming pool, which comprises: procuring a sample of the pool water; injecting into the sample an amount of a reagent which combines chemically with the chlorine therein to give a reaction product that builds in the sample water an opacity dependent in degree upon the amount of chlorine present; passing a beam of light through the reagent-conditioned sample water onto an electrical impedance that is variable in response to the intensity of the light beam as modulated by the opacity of the sample water; electrically comparing the electrical impedance value of the resultant response with the value of a reference standard electrical impedance simulating a predetermined pool water chlorine concentration whereby to obtain in an electronic comparison circuit a voltage of a value dependent upon the result of the comparison; utilizing that voltage to effect addition of fresh chlorine to the pool water when that voltage is equal to or less than the voltage across the combined electrical impedances when they are connected in series in the comparison circuit; and repeating the cycle of operations at predetermined intervals of time.

5. In the system of claim 2, said chemical reagent being orthotolidine.

6. In the method of claim 4, said reagent being orthotolidine.

7. In the method of claim 4, the reagent being orthotolidine in an amount at least sufficient to combine chemically with all the chlorine present in the sample.

8. The method of maintaining automatically in a continuously recirculating body of chlorinated water a chlorine concentration within a preselected critical range, which comprises: establishing an electrical control circuit including in series a fixed electrical resistance calibrated to simulate a condition in the body of water in which the concentration of chlorine is within the critical range, and a second electrical resistance variable in response to the intensity of a beam of light directed thereon; directing a beam of light onto the variable resistance and adjusting the intensity of the light beam to a value at which the combined resistances condition the control circuit to actuate voltage responsive means which operates to add chlorine to the body of water for a predetermined period of time; shunting the calibrated fixed resistance out of the control circuit; interposing in the path of the light beam a quiescent sample of the chlorinated water through which the light passes onto the variable resistance; injecting into the sample water an amount of orthotolidine sufficient to react chemically with all the chlorine in the water sample whereby to vary its opacity in proportion to the amount of chlorine therein and thus correspondingly vary the intensity of the light passing through the sample water; and utilizing the instant resistance of the light responsive variable resistance to establish in the control circuit a voltage which triggers operation of the voltage responsive chlorine addition means if and when the light responsive resistance assumes a value that restores in the control circuit the value of the resistance removed by shunting out the calibrated fixed resistance; and repeating at timed intervals the cycle of operations following shunting out the fixed calibrated resistance.

References Cited

UNITED STATES PATENTS

| | | | |
|---|---|---|---|
| 3,226,195 | 12/1965 | De Liste Nichols et al. | 250—218 |
| 3,233,781 | 2/1966 | Grubbs | 250—218 |
| 3,285,703 | 11/1966 | Narita et al. | 250—218 |

RALPH G. NILSON, Primary Examiner

M. ABRAMSON, Assistant Examiner

U.S. Cl. X.R.

356—201